United States Patent [19]

Nishimura et al.

[11] Patent Number: 4,472,686
[45] Date of Patent: Sep. 18, 1984

[54] CIRCUIT FOR REPRODUCING AND DEMODULATING MODULATED DIGITAL SIGNALS

[75] Inventors: Keizo Nishimura; Hiroyuki Kimura, both of Yokohama; Yasunori Kanazawa, Ibaraki, all of Japan

[73] Assignee: Hitachi, Ltd., Tokyo, Japan

[21] Appl. No.: 311,023

[22] Filed: Oct. 13, 1981

[30] Foreign Application Priority Data

Oct. 13, 1980 [JP] Japan ............................. 55-142110
Oct. 13, 1980 [JP] Japan ............................. 55-142111

[51] Int. Cl.³ .................................................. H03K 7/10
[52] U.S. Cl. ........................................ 329/50; 329/106; 329/107; 329/136; 375/94; 375/120
[58] Field of Search .................... 329/50, 104–107, 329/109, 136; 375/80–82, 94, 99, 120; 360/29, 30, 37.1, 38.1

[56] References Cited

U.S. PATENT DOCUMENTS 4,344,039 8/1982 Sugiura et al. ................. 329/50

FOREIGN PATENT DOCUMENTS

2359960 7/1974 Fed. Rep. of Germany .
2459885 6/1975 Fed. Rep. of Germany .
2622376 5/1977 Fed. Rep. of Germany .

*Primary Examiner*—Siegfried H. Grimm
*Attorney, Agent, or Firm*—Antonelli, Terry & Wands

[57] ABSTRACT

A circuit for reproducing and demodulating a modulated digital signal which is modulated in a predetermined modulation system such as MFM, EFM and so on. A phase of a clock having a frequency multiplied by an integral number of a bit frequency of the modulated digital signal, is restricted or controlled by a signal showing that a predetermined pattern of the modulated digital signal occurred. The modulated digital signal is demodulated by the thus restricted clock to produce digital informations "0" and "1". A main requirement for detecting the predetermined pattern of the modulated digital signal, is that a reproduced modulated digital signal is reliable. In order to compensate for the drop-out of the modulated digital signal, the demodulation circuit is provided with a modulated digital signal reproducing circuit for complementing a predetermined signal pattern when the drop-out occurred.

7 Claims, 12 Drawing Figures

| DROP-OUT DURATION | COMPLEMENTING MFM SIGNAL PATTERNS |
|---|---|
| 1T |  |
| 1.5T |  |
| 2.0T | i) <br>ii)  |
| 2.5T | i) <br>ii)  |
| 3.0T | i) <br>ii) <br>iii) <br>iv)  |
| 3.5T | i) <br>ii) <br>iii) <br>iv) <br>v)  |

CIRCUIT FOR REPRODUCING AND DEMODULATING MODULATED DIGITAL SIGNALS

BACKGROUND OF THE INVENTION

The present invention relates to a circuit for reproducing and demodulating a modulated digital signal which was modulated with a certain modulation system, and, in particular, a circuit for reproducing and demodulating for example MFM (Modified Frequency Modulation), EFM (Eight-to-Fourteen Modulation), and 3PM (Three Position Modulation) pulse signals or the like into an original pulse time-series signal with a certain accuracy.

There has been disclosed a prior art demodulating circuit for demodulating the MFM signals in Japanese Patent Publication No. 38884/79 published on Nov. 24, 1979, which was filed by the same assignee of the present application. An edge pulse to be generated at a rising edge and a falling edge, respectively, of the MFM pulse, and a clock pulse signal having a period T/2 (where T represents the shortest pulse width T of the MFM pulse signal) which is synchronized in phase with the rising edge and the falling edge of the MFM pulse signal, are inputted to the prior art demodulating circuit. The edge pulse signal is used to reset or initialize a counter which is then ready for counting the clock pulses. When the number of the clock pulses as counted becomes equal to 4, a reset pulse is produced. In this connection, it is to be noted that the MFM pulse signal is composed of only three types of pulses having the pulse widths or durations T, 1.5 T and 2T, respectively, wherein the maximum pulse width 2T occurs in correspondence to a bit pattern "101" of the original digital information. Accordingly, the reset pulse appearing at the output of the counter is produced only in response to the bit pattern of "101".

By the way, the edge pulse signal is also supplied to a monostable multivibrator which is triggered by the falling edge of the edge pulse, whereby pulses each having a pulse width equal to T/2 are produced. The clock pulse signal of the period T/2 undergoes a division-by-2 operation in a frequency divider which is adapted to be reset by the reset pulse supplied from the counter, resulting in a demodulating clock pulse signal being outputted. A D-type flip-flop is supplied with the pulse signal outputted from the monostable multivibrator and the demodulating clock signal from the frequency divider, to thereby latch the pulse signal outputted from the monostable multivibrator in response to the rising edge of the demodulating clock signal. The output signal from the D-type flip-flop thus constitutes a demodulated output signal of NRZ (non-return-to-zero) form which is in synchronism with the demodulating clock signal and is produced at a demodulated signal output terminal for external utilization.

As will be appreciated from the above description of the hitherto known MFM pulse signal demodulating circuit, because the output pulse signal produced by the monostable multivibrator is latched by the demodulating clock signal, errors or temperature-depending variations in the values of the CR-elements which determine the time constant of the monostable multivibrator will be reflected as variations or changes in the pulse width of the output pulse signal or as a reduction in the margin or tolerance of timing for the demodulation, which is a disadvantage. When the timing margin is to be as large as possible, then adjustment of the time constant is required, which is also a disadvantage. Further, the known MFM pulse signal demodulating circuit suffers a drawback in that pins for connection for externally mounted capacitors have to be provided for implementation in an LSI circuit.

Furthermore, the hitherto known MFM signal demodulating circuit suffers a drawback in that code errors are produced in the demodulated MFM signal when the phase of the MFM signal is inverted during an interval or duration in which a drop-out occurs in the MFM signal to be reproduced.

SUMMARY OF THE INVENTION

An object of the present invention is to eliminate the shortcomings of the prior art signal demodulating circuit described above and to provide a modulated digital signal demodulating circuit which can be operated in a stable manner without requiring adjustment and is suited for implementation as an LSI circuit.

Another object of the present invention is to provide a modulated digital signal demodulating circuit provided with a modulated digital signal reproducing circuit for reproducing a correct modulated digital signal by adding a complementary modulated digital signal when a drop-out occurs in the modulated digital signal.

In general, the MFM pulse signal is so modulated that the polarity thereof is inverted at a mid point of a pulse corresponding to a bit "1" of the original digital information and undergoes another polarity inversion at the boundary of two successive bits "00" of the digital information. Accordingly, when consideration is made on the assumption that each of the digital bit signals is divided into two parts, i.e. a fore or front half and a rear half, the MFM pulse signal which corresponds to the digital information "1" takes a logic combination of either "01" or "10", while the MFM pulse signal has a bit pattern of either "00" or "11" when the corresponding bit of the digital information is logic "0".

In view of the above consideration, it is proposed according to an aspect of a modulated digital signal demodulating circuit of the present invention that an input, for example, an MFM pulse signal is loaded into a shift register which shifts the MFM pulses at the timing of a clock signal having a period corresponding to half of the shortest pulse width T of the MFM signal for determining whether the corresponding digital information is "0" or "1" in dependence on whether the contents of the two adjacent bits in the shift register coincide with each other or not. The determination is effected periodically at a period corresponding to T, i.e. once for the two shifts effected with the period equal to T/2. In this connection, advantage of the fact is utilized such that only the digital information of the bit pattern "101" (that is "011110" or "100001" when each bit is divided into two halves) contains four successive bits all of either logic "1" or "0" in a four-bit shift register. If a pattern in the shift register is "1111" or "0000", a timing pulse is generated and simultaneously a discrimination is made whether two center bits in the four-bit shift register coincide with each other or not. An alternative discrimination may be made as to whether the two preceeding or succeeding bits in the shift register coincide with each other or not when the contents in the shift register become "0111" or "1000" after one shift following the "1111" or "0000" pattern in the shift register. Subsequently, determination of the two bits is made in a similar manner at the timing corresponding to the period T. In the case where the shift register is of a capacity greater than four bits, the timing for decision of the coincidence of bits may be correspondingly established in a similar manner. For example, when a five-bit shift register is employed, the timing may be so selected that determination as to the coincidence of the last two bits is effected when the contents of the shift register is "00001" or "11110".

Further, according to another aspect of the present invention, it is possible to detect if the MFM pulse signal deviates from the rule of the MFM due to error possibly occuring during transmission. For example, the MFM signal will never give rise to appearance of the bit patterns "0100", "0010", "0101", "1010", "1011" and "1101", when the original digital information is considered with each bit thereof being divided into two halves, (e.g. when the original digital information is considered in terms of the contents of the four-bit shift register shifted under the timing of the clock signal having the period corresponding to T/2). Accordingly, when the appearance of any one of these bit patterns is detected, it can be determined that an error has occurred. The same holds true, even when a shift register of a five-bit or greater capacity is employed. When the contents of for example a five-bit register is "11111", "01000", "00100", "00010", "10111", "11011", "11101", "01010", "01011", "10101" or "10100", this means that an error occurs, because none of these bit patterns conforms to the rule of the MFM.

Furthermore, according to another aspect of the present invention, a modulated digital signal reproducing circuit is incorporated into the modulated digital signal demodulating circuit, which serves to complement a digital signal when a drop-out occurs in the modulated digital signal. That is, when the signal drop-out condition is present, a complementing signal pattern corresponding to, for example, the MFM signal pattern which should inherently have been present in the drop-out interval is selected and read out from a read-only memory in dependence on the length of the signal drop-out interval or duration as well as the signal levels taken by the MFM signal immediately before and after the signal drop-out interval. By complementing the signal drop-out interval with the selected MFM signal pattern, the MFM signal properly reproduced can be obtained.

DESCRIPTION OF THE PREFERRED EMBODIMENTS

In the following, the invention will be described in more detail in conjunction with exemplary embodiments thereof.

Figure 1:
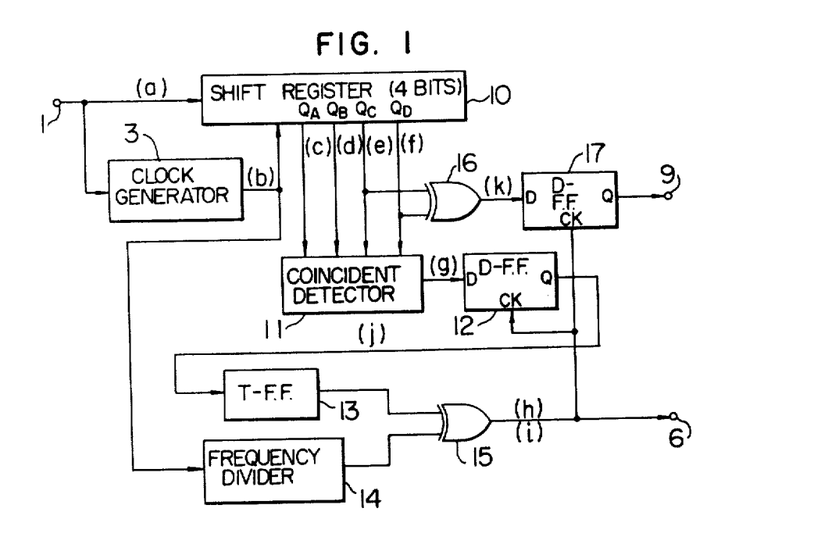
FIG. 1 is a block diagram showing one embodiment of a modulated digital signal demodulating circuit of the present invention.
Figure 2:
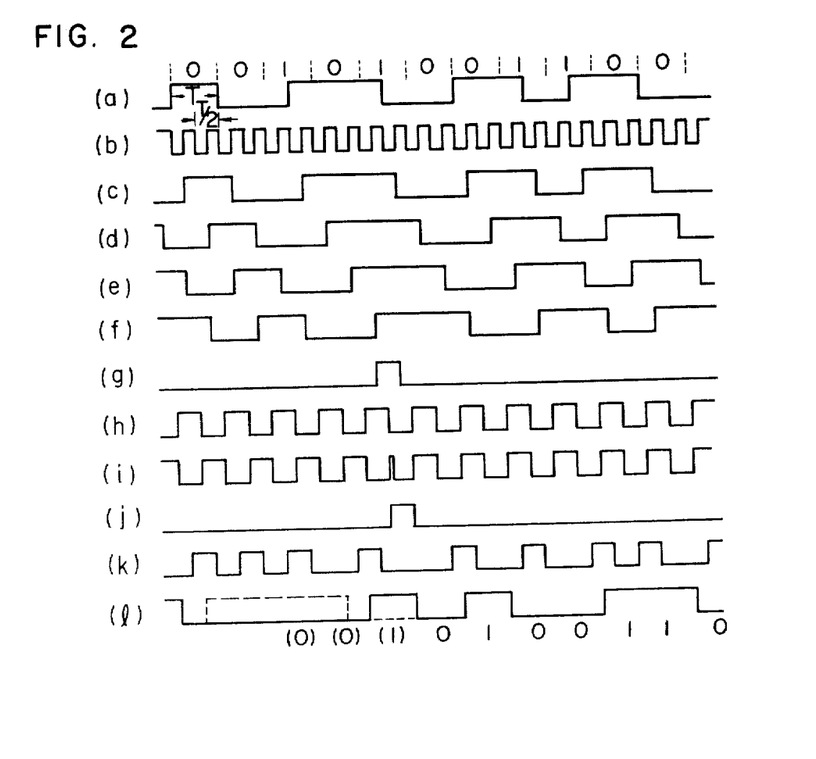
FIG. 2 shows signal waveform relationships for explaining operations of the demodulating circuit of FIG. 1.

FIG. 1 shows in a block diagram a general arrangement of a MFM signal demodulating circuit according to an embodiment of the invention, and FIG. 2 shows waveforms of signals produced at various circuit points of the demodulator circuit shown in FIG. 1.

A digital MFM signal a received at a MFM signal input terminal 1 and having a waveform shown in FIG. 2 at (a) is supplied to a clock generator circuit 3 and a shift register 10. The clock generator circuit 3 is adapted to produce clock pulses b shown in FIG. 2 at (b) in phase with the rising and the falling edges of the MFM pulses a with a clock period corresponding to T/2 (where T represents the shortest pulse width of the MFM pulse a). The shift register 10 is of four-bit capacity and is adapted to shift the pulses applied thereto from the MFM signal input terminal 1 in response to the rising edge of the clock pulse b produced from the clock generator circuit 3. For the MFM input signal of the waveform shown in FIG. 2 at (a), the outputs of the individual stages QA, QB, QC and QD of the shift register 10 will have waveforms such as illustrated at (c), (d), (e) and (f), respectively, in FIG. 2. The outputs of the register stages QA, QB, QC and QD are coupled to a coincidence or comparison circuit 11 which is adapted to produce a coincidence signal g of "1" such as shown in FIG. 2 at (g), when the four input bits (c, d, e, f) supplied from the shift register 10 are simultaneously all "0's" or "1's", i.e. when the original digital information is "101".

On the other hand, the clock pulse signal b outputted from the clock generator circuit 3 undergoes a division-by-2 frequency division in a frequency divider 14, whereby a clock pulse signal of a clock period T is produced. The output clock pulse signal of the period T produced from the frequency divider 14 is applied to one input of an Exclusive-OR gate 15, whereby the clock pulse is transferred to a demodulating clock output terminal 6 after having been inverted in phase, provided that the other input to the Exclusive-OR gate 15 is logic "1". However, when the other input to the Exclusive-OR gate 15 is logic "0", the clock pulse transmitted to the demodulating clock output terminal 6 does not undergo phase inversion. Additionally, the clock signal output from the Exclusive-OR gate 15 is applied to a clock terminal CK of a D-type flip-flop 12 which has a data terminal D connected to the output terminal (g) of the coincidence detector circuit 11, so that the input data is latched by the D-type flip-flop 12 in response to the rising edge of the clock pulse applied to the clock terminal CK. As a consequence, when the clock pulse signal applied to the terminal CK is of a phase as shown in FIG. 2 at (h), the output signal produced from a terminal Q of the flip-flop 12 remains logic "0". However, when the clock signal applied to the clock terminal CK is of a phase opposite to the one shown at (h), the output signal produced from the coincidence detection circuit 11 and having the waveform shown at (g) in FIG. 2 is latched by the D-type flip-flop 12, resulting in the output signal produced at the terminal Q having a waveform as shown in FIG. 2 at (j). The output (j) at the terminal Q of the D-type flip-flop 12 is connected to the input of a T-type flip-flop 13, the output signal of which is inverted in response to the rising edge of the input signal. Accordingly, when the clock signal output from the Exclusive-OR circuit 15 is of a phase as shown in (h) in FIG. 2, the output from the T-type flip-flop 13 connected to the other input of the Exclusive-OR circuit 15 remains unchanged, resulting in the phase of the clock pulse output from the Exclusive-OR circuit 15 remaining non-inverted. However, when the clock pulse output from the Exclusive-OR circuit 15 is opposite to the one shown at (h) in FIG. 2, the output signal from the T-type flip-flop 13 is inverted in response to the rising edge of the pulse (j) shown in FIG. 2 (i.e. in response to the bit pattern "101"), as a result of which the phase of the clock pulse signal produced from the Exclusive-OR circuit 15 is inverted as shown in FIG. 2 at (i) to be subsequently in phase with the clock signal (h).

The last two bit outputs QC and QD of the shift register 10 are applied, respectively, to both inputs of another Exclusive-OR gate 16. The output signal produced from the Exclusive-OR circuit 16 and having a waveform shown in FIG. 2 at (k) is applied to a data input terminal D of a D-type flip-flop 17 which has a clock input supplied from the output of the Exclusive-OR gate 15, so that the input data supplied to the terminal D is latched in response to the rising edge of the clock pulse output from the Exclusive-OR circuit 15. Thus, when clock pulse signal supplied from the Exclusive-OR gate 15 is of a phase as shown at (h) in FIG. 2, the output signal produced at the output terminal Q of the D-type flip-flop 17 will have a waveform as shown in a solid line in FIG. 2 at (l). At that time, the MFM pulse signal a is properly demodulated in a NRZ-form and is produced at the demodulated signal output terminal 9. When phase of the clock signal is inverted (i.e. opposite phase to the clock signal h) at the beginning of the demodulating operation, for example, the waveform of the demodulated MFM signal is as shown in broken line in FIG. 2 at (l), which means that the input MFM signal has not been correctly demodulated. However, since the correct phase of the clock signal is restored at the bit pattern of "101" in the manner described above, the succeeding input MFM pulse signal will be subsequently demodulated correctly in the NRZ-form.

Figure 3:
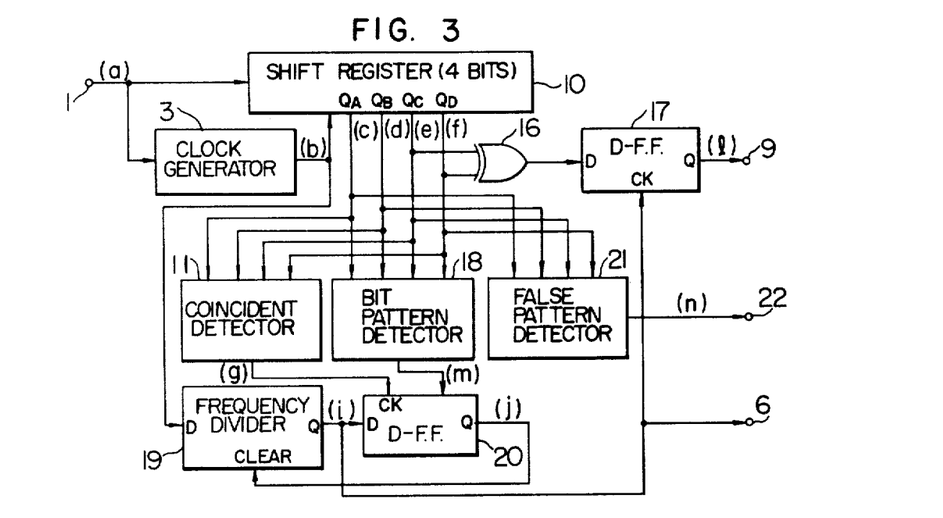
FIG. 3 is a block diagram of another embodiment of the demodulating circuit of the present invention.
Figure 4:
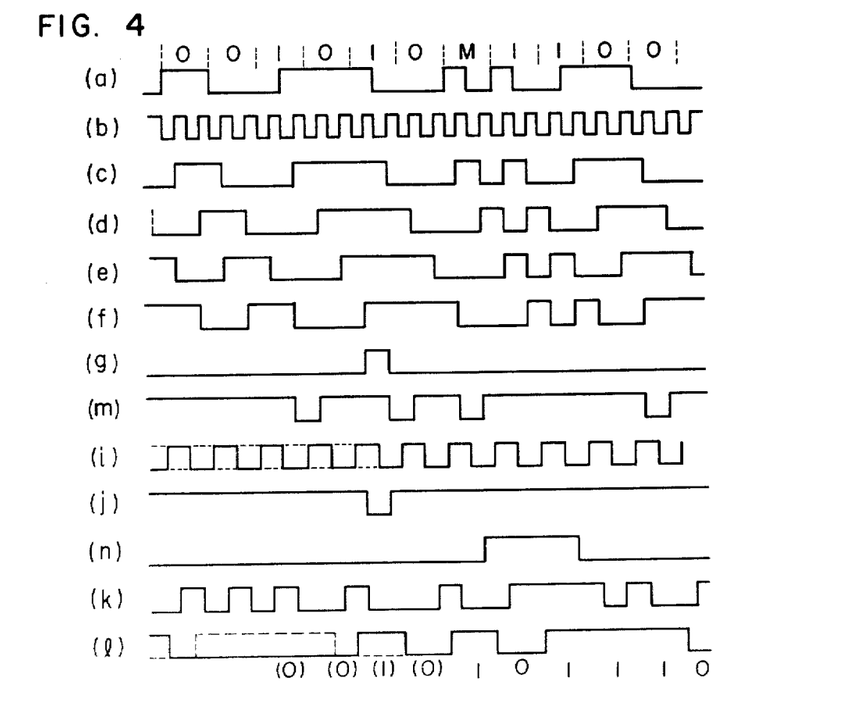
FIG. 4 shows signal waveform relationships for explaining operations of the demodulating circuit of FIG. 3.

FIG. 3 shows an MFM signal demodulating circuit which is imparted with a capability of detecting a signal which does not conform to the rule of the MFM signal according to another embodiment of the present invention, while FIG. 4 shows waveforms of signals produced at different circuit points of the demodulator circuit shown in FIG. 3.

Referring to FIG. 3, a digital MFM signal which contains an error M and thus does not conform to the rule of the MFM as shown in FIG. 4 at (a) is received at an MFM signal input terminal 1 and is supplied to a clock generator circuit 3 and a shift register 10, both of which are implemented in the circuit configurations similar to those shown in FIG. 1, respectively. The output signal from the clock generator circuit 3 as well as the outputs from the shift stages QA, QB, QC and QD of the shift register 10 are such as shown in FIG. 4 at (b), (c), (d), (e) and (f), respectively. The outputs of the individual stages QA, QB, QC and QD of the shift register 10 are connected to a coincidence detection circuit 11 which is adapted to produce a coincidence signal "1" as shown in FIG. 4 at (g) upon coincidence of all the four inputs, i.e. in response to the bit pattern "101" of the original digital information. In addition, the outputs of the stages QA, QB, QC and QD of the shift register 10 is connected to a pattern detecting circuit 18 which is adapted to produce an output signal having a waveform as shown in FIG. 4 at (m). As can be seen, the output of the pattern detecting circuit 18 is logic "0", when the parallel bit outputs from the register stages QA, QB, QC and QD are in a form of either "0111" or "1000".

The clock pulse signal b produced from the clock generator circuit 3 is subjected to a division-by-2 operation in a frequency divider 19. The output of the frequency divider 19 is fed to a data terminal D of a D-type flip-flop 20 which has a clock terminal CK for receiving the output signal g (refer to FIG. 4) from the coincidence detection circuit 11. In response to the rising edge of the clock pulse applied to the terminal CK, the D-type flip-flop 20 latches the input data supplied to the terminal D thereof. Further, the D-type flip-flop 20 is adapted to be set in response to the logic "0" level of the output signal m (FIG. 4) from the pattern detecting circuit 18. Accordingly, when the output pulse signal from the frequency divider 19 is of such phase as shown in a solid line in FIG. 4 at (i), the output signal from the output terminal Q of the D-type flip-flop 20 is maintained at the "1" level. On the other hand, when the output pulse signal from the frequency divider 19 is of a phase as shown in broken line at (i) of FIG. 4, the output signal (j) appearing at the terminal Q of the D-type flip-flop 20 is at the "0" level in correspondence to the bit pattern of "101". Since the output terminal Q of the D-type flip-flop 20 is connected to a clear terminal CLEAR of the frequency divider 19, the latter is reset at this time point, whereby the Q-output pulse signal of the frequency divider 19 is subsequently of a phase as shown in a solid line at (i) in FIG. 4. The Q-output of the frequency divider 19 is produced at the demodulating clock output terminal 6 and at the same time is supplied to the clock terminal CK of the D-type flip-flop 17 having a terminal D to which the output signal k (refer to FIG. 4) from an Exclusive-OR circuit 16 is applied, the Exclusive-OR circuit 16 having inputs connected to the register outputs QC and QD, respectively, in a manner similar to the circuit arrangement shown in FIG. 1. On these conditions, the signal output from the terminal Q of the D-type flip-flop 10 represents a properly demodulated signal l of NRZ-form, as is shown in FIG. 4 at (l).

There is provided an error pattern detecting circuit 21 having bit inputs connected to the outputs QA, QB, QC and QD, respectively, of the shift register 10. When the input signal to the error pattern detecting circuit 21 is of a bit pattern of "0100", "0010", "0101", "1010", "1011" or "1101", the error detecting circuit 21 produces a logic "1" level, whereby an error detection signal having a waveform as shown in FIG. 4 at (l) is produced at an error detection output terminal 22, indicating that an error which does not conform to the rule of the MFM is involved in the input MFM signal a.

According to another embodiment of the invention in which a register of capacity equal to or greater than six bits is employed, there can be additionally provided means for avoiding a timing error which may be brought about by drop-out of an information bit or bits during transmission. More particularly, the MFM input signal is supplied to a 6-bit shift register which is adapted to shift the input bits with a clock period equal to T/2 where T represents the bit period of the MFM input signal. When the bit contents in the 6-bit shift register become "011110" or "100001", a timing pulse is produced to adjust the phase of the demodulating clock signal so that "0" or "1" of the original information "101" may be restored. In this manner, even when the input signal is erroneously "111110", "100000" or the like due to the drop-out of a bit or bits, the timing pulse can be prevented from being produced at incorrect time points. Such advantageous effect becomes more significant, as the bit capacity of the shift register as used becomes greater. For example, when the timing pulse is to be produced for the bit pattern of "00111100" or "11000011" in the case where a 8-bit shift register is employed, erroneous timing can be positively suppressed for the signals of false bit patterns such as "10111100", "01000010" and so forth.

Figure 5:
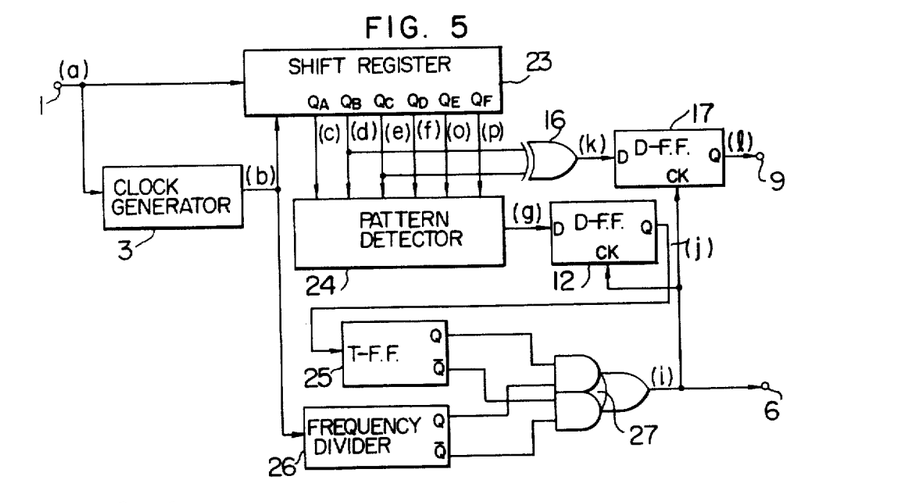
FIG. 5 is a block diagram showing still another embodiment of the demodulating circuit of the present invention.

The MFM pulse signal demodulating circuit provided with the means for excluding possible generation of the erroneous timing according to the further embodiment of the invention as brief by described above will now be described in more detail by referring to FIG. 5 which shows in a block diagram the MFM pulse signal demodulating circuit in which a six-bit shift register is employed in combination with FIG. 6 which shows signal waveforms to illustrate operations of the circuit shown in FIG. 5.

Figure 6:
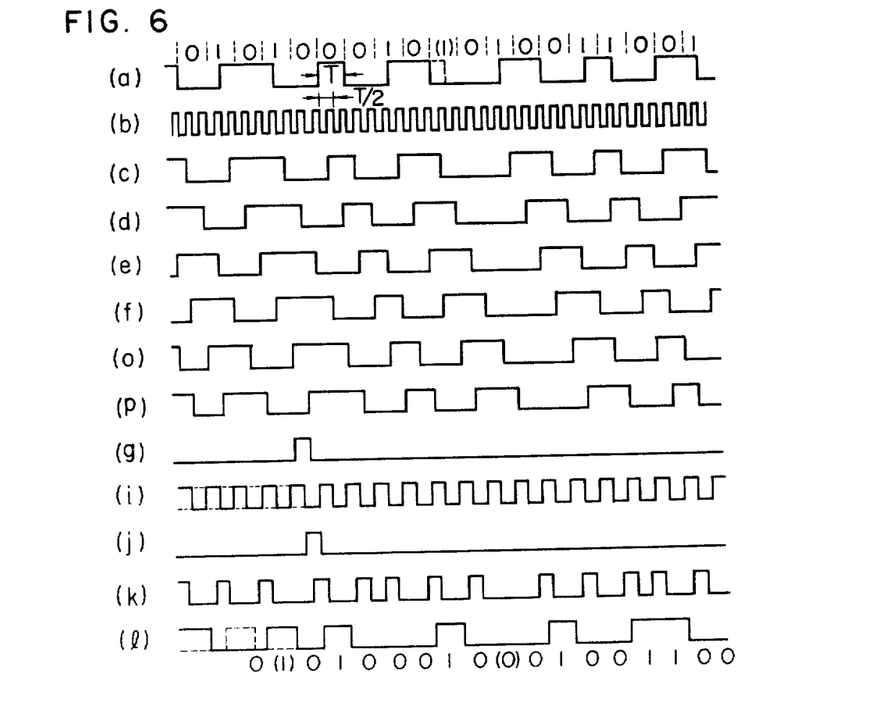
FIG. 6 shows signal waveform relationships for explaining operations of the demodulating circuit of FIG. 5.

A digital MFM signal a of a waveform shown in FIG. 6 at (a) is applied to an MFM pulse signal input terminal 1 and hence is supplied to a clock generator circuit 3 and a six-bit shift register 23. The clock generating circuit 3 is adapted to produce a clock pulse signal b (FIG. 6) composed of pulses produced in phase with the rising edge and the falling edge of the input MFM pulse signal (a) with a period of T/2 where T represents the bit period of the input digital MFM signal. The shift register 23 is provided with a capacity of six bits as mentioned above in the case of the embodiment being described and is adapted to shift the input MFM signal a fed from the input terminal 1 in response to the rising edge of the clock pulse signal produced from the clock generating circuit 3 with the period of T/2. For the input signal of the waveform illustrated in FIG. 6 at (a), the output signals from individual stages QA, QB, QC, QD, QE and QF of the shift register 23, have waveforms as shown in FIG. 6 at (c), (d), (e), (f), (o) and (p), respectively. The outputs from the stages QA, QB, QC, QD, QE and QF are coupled to the respective inputs of a pattern detecting circuit 24 which produces a timing pulse of logic "1" as shown in FIG. 6 at (g) at the instant when the bit contents of the shift register 23 supplied to the pattern detecting circuit 24 becomes "011110"or "100001", that is, when the original digital information takes the bit pattern of "101". In this connection, it should be noted that even when the original digital information contains the bit pattern of "101" as indicated by broken lines in FIG. 6 at (a), it may occur that an input MFM signal missing due to the drop-out of a bit as indicated by a solid line in the same figure at (a) may be received. In such case, the contents of the shift register 23 will never be of such pattern as "011110" or "100001", as a result of which the pattern detecting circuit 24 is prevented from producing an erroneous or false timing pulse.

On the other hand, the clock pulse signal b (refer to FIG. 6 at (b)) produced from the clock generator circuit 3 is subjected to a division-by-2 operation through a frequency divider 26 which has an output Q and a complementary output $\overline{Q}$ from which clocks each of a period T are produced in opposite phase relation and supplied to a switching circuit 27 which has other inputs supplied with switching control signals from output terminals Q and $\overline{Q}$ of a T-type flip-flop 25. When the output Q of the T-type flip-flop 25 is logic "1" with the $\overline{Q}$-output thereof being "0", the switching circuit 27 allows the output clock signal Q of the frequency divider 27 to be produced at the output terminal 6. On the other hand, when the Q-output of the T-type flip-flop 25 is logic "0" with the $\overline{Q}$-output being "1", the switching circuit 27 is so controlled as to transmit therethrough the clock signal produced at the output terminal $\overline{Q}$ of the frequency divider 26 to the output terminal 6. The output signal produced from the switching circuit 27 is applied to the clock terminal CK of the D-type flip-flop 12 which has a data terminal D supplied with the output signal g (refer to FIG. 6) from the pattern detecting circuit 24. Thus, when the output clock signal from the switching circuit 27 is of such phase as indicated by a broken line in FIG. 6 at (i), the D-type flip-flop 12 operates to latch the timing pulse produced in correspondence to the occurrence of the bit pattern "101" in response to the rising edge of the clock pulse produced by the switching circuit 27, to thereby produce the output pulse j shown in FIG. 6 at (j). This output pulse signal j produced from the D-type flip-flop 12 is supplied to the T-type flip-flop 25, resulting in the Q-output of the latter being changed over to "0" from "1" with the $\overline{Q}$-output being inverted from "1" to "0". Consequently, the clock signal output from the switching circuit 27 takes a phase as indicated by a solid line in FIG. 6 at (i) after the occurrence of the timing pulse g (refer to FIG. 6). Under the circumstance, the clock signal supplied to the D-type flip-flop 12 is out of phase from the timing pulse g. Thus, the latter is not latched by the D-type flip-flop 12, resulting in no production of the Q-output j from the D-type flip-flop 12. Consequently, neither the Q-output nor the $\overline{Q}$-output of the T-type flip-flop is inverted, whereby the output clock signal from the switching circuit 27 is maintained at the phase indicated by the solid line curve shown at (i) in FIG. 6.

The two outputs QB and QC of the shift register 23 are applied to the respective inputs of an Exclusive-OR circuit 16, the output signal of which is then of such waveform as shown at (k) in FIG. 6. The output signal k from the Exclusive-OR circuit 16 is supplied to the data terminal D of the demodulating D-type flip-flop 17, while the output terminal of the switching circuit 27 is additionally connected to the demodulating clock output terminal 6 and at the same time connected to the clock terminal CK of the D-type flip-flop 17. Thus, the Q-output signal of the D-type flip-flop 17 represents the correctly demodulated signal of NRZ form shown at (l)

in FIG. 6, when the clock signal as applied is of the phase indicated by the solid line curve in FIG. 6 at (i).

Further, even when the input MFM signal contains an elongated interval containing a succession of "0's" or "1's" due to the drop-out or the like cause notwithstanding the original digital information containing "101", or when an interval containing a train of "0's" is produced which is longer than the proper interval of "101" at locations outside of the latter due to the drop-out or the like cause, there can occur no erroneous demodulation, because the pattern detecting circuit 24 produces no timing pulse, involving no change in the phase of the output clock signal produced from the switching circuit 27.

As will be appreciated from the foregoing description, it is possible to implement the MFM signal demodulating circuit which can be operated stably without using time constant elements such as CR-elements of the monostable multivibrator and which thus requires no adjustment and can be realized in LSI circuits. Further, the MFM signal demodulating circuit according to the invention can be imparted with a capability to detect the signal which does not conform to the rule of the MFM. Besides, generation of the erroneous timing pulse due to the signal which is departed from the rule of the MFM can be positively suppressed. Thus, the MFM signal demodulating circuit which exhibits a high reliability in operation and is immune to generation of erroneous or false codes has now been accomplished according to the invention.

In the embodiments as mentioned above, the clock generator circuit 3 generates clock pulses in phase with the rising and falling edges of the MFM digital signal. Next, another embodiment of the clock generator circuit which operates with an improved stability will be explained hereunder.

Figure 7:
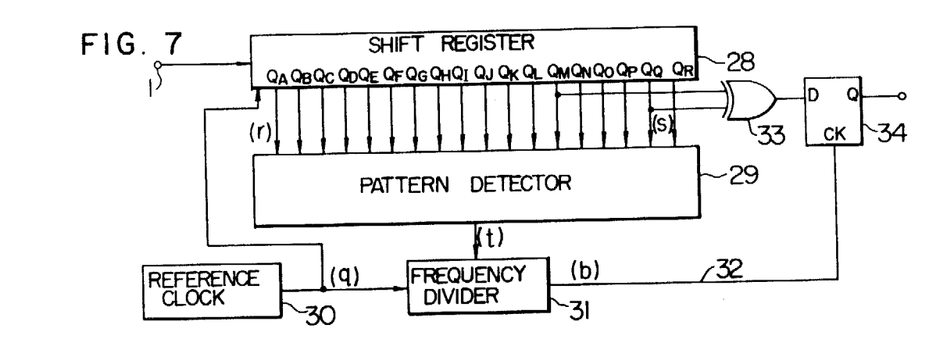
FIG. 7 is a block diagram of one embodiment of a clock generating circuit used in the demodulating circuit of the present invention.
Figure 8:
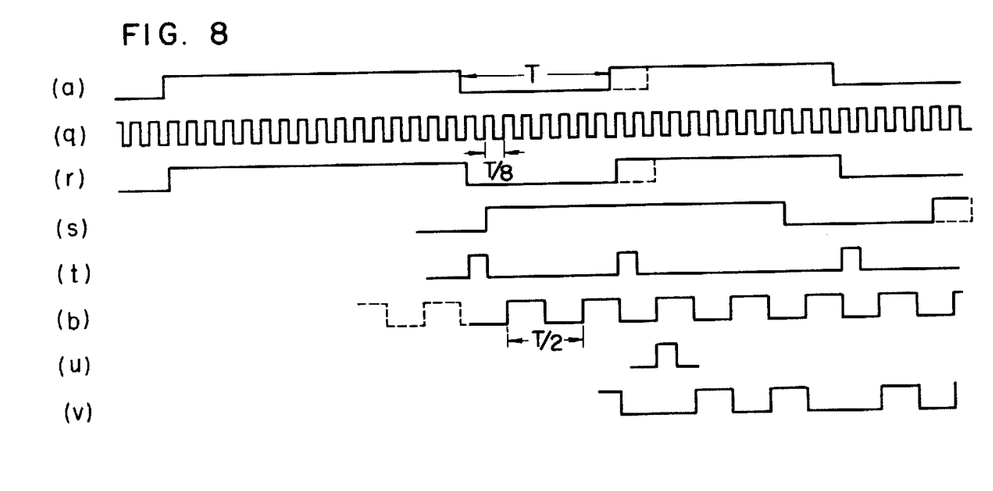
FIG. 8 shows signal waveform relationships for explaining operations of the clock generating circuit of FIG. 7.

FIG. 7 shows the embodiment of the clock generator circuit and FIG. 8 shows waveforms of the operation thereof. In FIG. 7, 1 designates the MFM signal input terminal, 28 a shift register, 29 a pattern detecting circuit, 30 a reference clock generator, 31 a frequency divider, and 32 a frequency divided clock output terminal, 33 an Exclusive-OR circuit and 34 a D-type flip-flop.

The MFM digital signal as shown in FIG. 8 at (a) inputted to the MFM signal input terminal 1 is passed to the shift register 28 which comprises 18-stages. The shift register 28 shifts the digital signal at successive rising edges of the clock as shown in FIG. 8 at (q) of the reference clock generator 30. The clock of the reference clock generator 30 is a fixed clock having a one-eighth period of the minimum pulse width T of the MFM signal (a), and having no phase relationship with the rising and falling edges of the MFM signal. Outputs $Q_A$ to $Q_R$ of the shift register 28 are inputted to the pattern detecting circuit 29 where an output at $Q_A$ as shown in FIG. 8 at (r), outputs at $Q_B$ to $Q_Q$ delayed by the corresponding numbers of the clock pulses, respectively, and an output at $Q_R$ as shown in FIG. 8 at (s) are obtained. The pattern detecting circuit 29 is adapted to produce a detection pulse as shown in FIG. 8 at (t) when the outputs at $Q_A$ to $Q_R$ assume either one of eight kinds of patterns of "011111111111111110", "100000000000000001", "011111111000000001", "100000000111111110", "011111111000000000", "100000000111111111", "011111111111100000", and "100000000000011111", in that order. These eight kinds of patterns correspond to patterns to be taken by the shift register when the rising or falling edge of a pulse correctly complying with the MFM signal rule comes at the first stage of the shift register. The frequency divider 31 operates to divide the frequency of the reference clock by four and is reset by the detection pulse (t) of the pattern detection circuit 29. Therefore, the output of the frequency divider (31) is outputted at a divided clock output terminal as shown in FIG. 8 at (b) which is a clock having a period of T/2 and being in phase with the edges of the input MFM signal. If the frequency divider 31 is reset by the edges of the input MFM signal without using the pattern detection circuit 29, there occurs a problem when the input MFM signal slips out of the correct MFM signal rule. That is, if an error occurs in the input MFM signal as shown by broken line in FIG. 8 at (a) which does not comply with the MFM signal rule, the frequency divider is abruptly reset by a pulse as shown in FIG. 8 at (u) to cause the problem that the divided clock runs out of phase and wrong numbers of the divided clocks result. However, according to the embodiment of the present invention, the pattern detection circuit 29 produces no reset pulse for the frequency divider 31 as shown by broken line in FIG. 8 at (b) to prevent any influence on the divided clock.

As explained above, a stable operation of the clock generator circuit is obtained. In this embodiment, the period of the reference clock is one-eighth the minimum pulse width T of the MFM signal and there is somewhat of a difference in phase between the divided clock and the edges of the MFM signal. However, such difference causes no problem and a high accuracy can be realized if the frequency of the reference clock is high. In addition, phase difference appearing in this embodiment carries no weight.

The above mentioned technology in the embodiment described above can be applied not only to a MFM signal demodulating circuit but also to a circuit which produces clock signals in phase with the edges of any input signal having a certain rule concerning the durations between the neighboring edges thereof. That is, the above embodiment can be applied to a demodulating circuit where, for example, a 3PM or EFM input signal is demodulated, e.g., a signal which was subject to NRZI modulation where a signal level inverts in response to a digital information "1" and there is a certain rule concerning the duration between the neighboring digital information "1"'s. In this case, if the period of the reference clock is set to be one fourth of the period of the bit period and if an exclusive OR of the output $Q_M$ and the output $Q_Q$ at the shift register 28 is taken by the exclusive OR circuit 33 so that the rising edge of the divided clock of the frequency divider 31 is used to strobe an output of the exclusive OR at the D flip-flop 34, the digital information of "0" and "1" can be correctly demodulated at the Q output of the D flip-flop 34.

Figure 9:
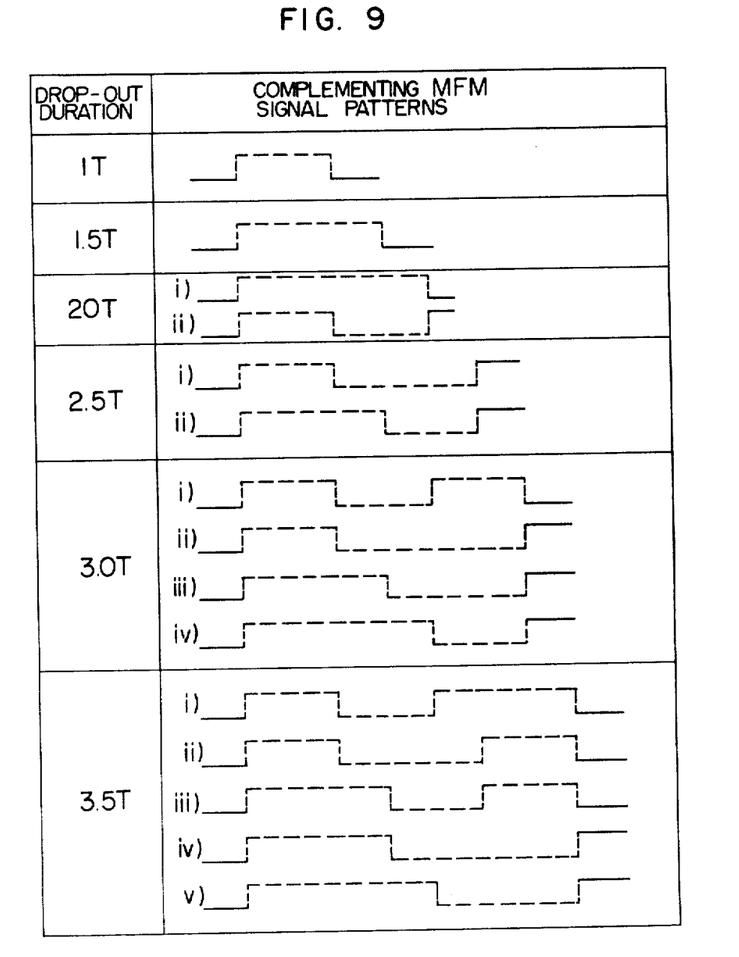
FIG. 9 is an explanatory view showing a variety of MFM signal pattern to be complemented during the drop-out of the MFM signal.

An embodiment of a reproducing circuit capable of complementing a signal when a drop-out of the reproduced signal occurs, is explained hereunder by way of an example using the MFM signal. In FIG. 9, there are summarized the complementing MFM signal patterns with which the MFM signal can be complemented during the signal drop-out interval or period. As can be seen from the diagram, when the signal drop-out duration is equal to T, 1.5T or 2.0T, the signal pattern required for complementing the signal drop-out can be definitely determined on the basis of the levels or states taken by the MFM signal immediately before and after the signal drop-out interval. When the signal drop-out interval or duration becomes longer, two or more signal patterns will be required for the satisfactory complementation, which can be accomplished by selecting correspondingly the correct pattern signals according to another feature of the invention.

In this manner, it is possible according to the invention to reproduce correctly even the MFM signal suffering a signal drop-out (i.e. partially lost MFM signal) by detecting the duration of the signal drop-out interval as well as the states or levels taken by the MFM signal immediately before and after the signal drop-out interval.

Figure 10:
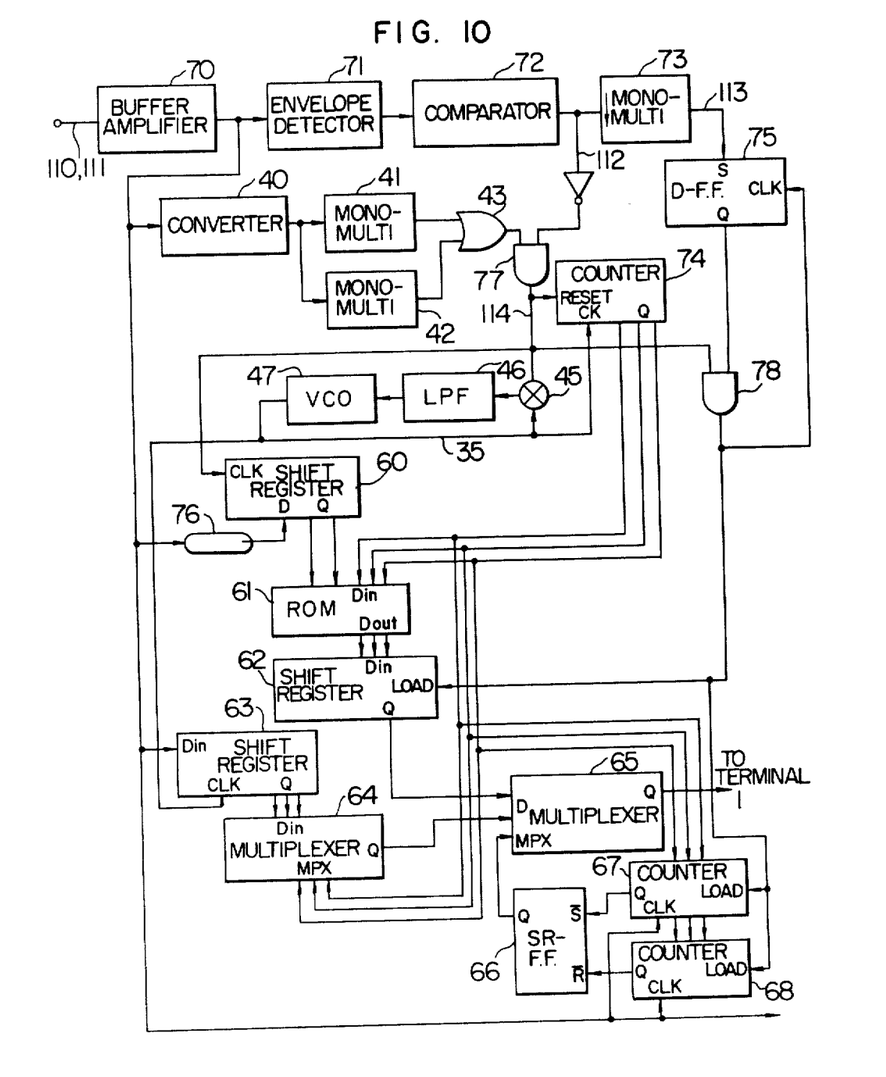
FIG. 10 is a block diagram showing one embodiment of a modulated digital signal reproducing circuit of the present invention.

FIG. 10 shows a circuit arrangement of an MFM signal reproducing circuit. In the figure, reference numeral 40 denotes a converter, 41 and 42 denote monostable multivibrators, 43 denotes an OR gate, 45 denotes a phase comparator, 46 denotes a low pass filter or LPF, 47 denotes a voltage controlled oscillator (hereinafter referred to simply as VCO), 60, 62 and 63 denote shift registers, 61 denotes a read-only memory or ROM, 64 and 65 denote multiplexers, 66 denotes an SR-flip-flop (set-reset flip-flop), 67, 68 and 74 denote counters, 70 denotes a buffer amplifier, 71 denotes an envelope detection circuit, 72 denotes a comparator, 73 denotes a monostable multivibrator, 75 denotes a D-type flip-flop, 76 denotes a delay circuit, and numerals 77 and 78 denote AND gates.

In the circuit arrangement illustrated in FIG. 10, the monostable multivibrators 41 and 42 and the OR gate 43 serve to detect the inversion points of the MFM signal, while the phase-locked loop constituted by the phase comparator 45, the low-pass filter 46 and the voltage controlled oscillator or VCO 47 serves to reproduce a clock signal which is in synchronism with the inversion points of the MFM signal. Further, the monostable multivibrator 73, the D-type flip-flop 75 and the AND gate 78 constitute a logic circuit for producing a first MFM edge signal representative of only the first edge of the MFM signal which makes appearance after the interval in which the signal is dropped out. The shift register 63 serves to delay the MFM signal.

Next, operation of the MFM signal reproducing circuit mentioned above will be described with reference to waveform diagrams shown in FIG. 11, in which a waveform 110 represents an MFM signal in which the signal drop-out is absent, 111 represents an MFM signal which suffers signal drop-outs a and b, 112 represents a signal drop-out detection signal, 113 represents a drop-out interval termination signal, and a waveform 114 represents an MFM edge signal.

The MFM signal 110 or 111 as picked up from a recording medium (not shown) is first applied to the buffer amplifier 70 and the output signal of which is then shaped by the converter 40. The shaped MFM signal output from the converter 40 is supplied to a logic circuitry constituted by the monostable multivibrators 41 and 42 and the OR gate 43, whereby the polarity inversion points of the MFM signal are detected, as in the case of the hitherto known MFM signal reproducing circuit described hereinbefore. The signal representative of the polarity inversion points is supplied to the phase-locked loop (PLL) circuit, resulting in the clock signal 35 (refer to FIG. 2 at (b)) being produced by the VCO 47 in symchronism with the MFM signal.

On the other hand, the MFM signal transmitted through the buffer amplifier 70 is supplied also to the envelope detection circuit 71 for detecting the signal drop-out on the basis of the lowering in the level of the envelope signal. The drop-out signal thus detected and representing the drop-out of the MFM signal is shaped by the comparator 72. In the case of the MFM signal 111 in which the drop-out a and b are present, the output signal produced from the comparator 72 corresponds to the signal drop-out detection signal designated by the reference numeral 112 in FIG. 11.

The counter 74 has a count input supplied with the clock signal 35 produced by the VCO 47 and a reset terminal to which a reset signal is applied. The reset signal is constituted by the MFM edge signal 114 produced from the AND gate 77. Thus, the counter 74 is reset at every signal inversion point of the MFM signal. More specifically, since the reset terminal of the counter 74 is usually supplied with the output pulse signal from the OR-gate 43 which is produced upon inversion or transition of the MFM signal, it can be said that the counter 74 usually performs the counting operation for determining the pulse width or duration of the MFM signal pulse. However, upon occurrence of the signal drop-out, the AND gate 77 is blocked. As the consequence, no reset signal is applied to the reset terminal of the counter 74 during the signal drop-out interval in which the signal drop-out is present. Such situation can be seen from the waveform of the MFM signal 114. In this manner, the counter 74 is adapted to determine the inter-pulse interval of the MFM edge signal 114 which includes or covers the signal drop-out interval.

The shift register 70 has a clock terminal CLK supplied with the MFM edge signal 114 and a data terminal D supplied with the MFM signal which has been delayed by means of the delay circuit 76. Thus, the shift register 60 can store therein the high "1" or low "0" level state taken by the MFM signal immediately before the occurrence of the signal drop-out, during the signal drop-out interval and immediately after the signal drop-out. From the shift register 60, there are produced at the outputs Q the level signals representative of the levels or states of the MFM signal immediately before and after the occurrence of the signal drop-out, while the counter 74 produces a count output signal representative of the inter-pulse interval of the MFM edge signal inclusive of the signal drop-out interval. Both of these output signals are inputted to the read-only memory or ROM 61 which is previously loaded with the complementing MFM signal patterns such as shown in FIG. 9 to be inserted in the signal drop-out interval for complementing the corresponding signal drop-outs. Thus, a complementing MFM signal pattern is selected in dependence on both the input signals supplied from the shift register 60 and the counter 74 and outputted from the ROM 61. The selected complement MFM signal pattern is loaded in the shift register 62 under timing of the output signal from the AND gate 78.

Figure 11:
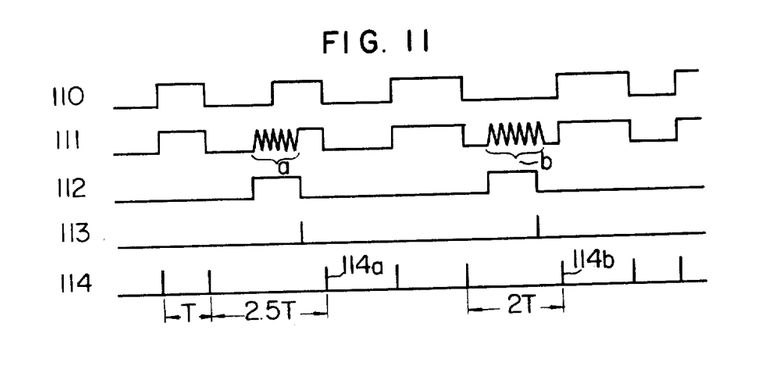
FIG. 11 shows signal waveform relationships for explaining operations of the reproducing circuit of FIG. 10.

In the case of the circuit arrangement shown in FIG. 11, it is assumed that the MFM signal 111 is at the high or "1" level immediately before the occurrence of the signal drop-out a and at the low or "0" level immediately after the signal drop-out a, while the signal drop-out interval is of the duration equal to 2.5T. On the other hand, the MFM signal 111 is at the "1" level immediately before and after the signal drop-out b with the signal drop-out interval being 2T.

The monostable multivibrator 73 produces the signal drop-out interval termination signal 113 representative of termination of the signal drop-out detection signal 112. The signal 113 is effective for setting the D-type flip-flop 75, resulting in the output signal of "1" level being produced from the D-type flip-flop 75 and applied to one input of the AND gate 78. Assuming now that either the MFM edge signal 114a or 114b shown in FIG. 11 is applied to the other input of the AND gate 78, the MFM edge signal 114a or 114b is gated through the AND gate 78 and produced as the input signal to the succeeding stage. At the same time, the MFM edge signal 114a or 114b is supplied to the reset terminal of the D-type flip-flop 75 to reset the latter. As a consequence, the AND gate 78 is blocked to inhibit the subsequent passage of the MFM edge signal 114. In this manner, only the first MFM edge signal that makes an appearance after termination of the signal drop-out interval is produced as the output signal.

The MFM signal is usually transmitted to the multiplexers 64 and 65 to be outputted from the multiplexer 65 after having been delayed through the shift register 63. However, upon occurrence of the signal drop-out in the MFM signal, the multiplexer 64 is changed over to the state for inhibiting the passage of the MFM signal. At the same time, the inherent MFM signal is replaced by the complementing MFM signal pattern through the multiplexer 65. Such change-over is effected by triggering the SR-flip-flop 66 by the output signals from the counters 67 and 68 loaded with the value corresponding to the signal drop-out interval upon occurrence of the first MFM edge signals 114a and 114b which make appearance after termination of the signal drop-out interval. Accordingly, the complemented MFM signal is obtained at the Q output terminal of the multiplexer 65. Then, the complemented MFM signal is supplied at the input terminal 1 in FIGS. 1, 3 and 5.

As will be appreciated from the foregoing description, it is possible to reproduce the signal which is regarded to be inherently erroneous due to the presence of signal drop-out as the correct signal by complementing the signal drop-out with the corresponding MFM signal pattern which is stored for complementation in the ROM. In this connection, it should be mentioned that, as the signal drop-out interval becomes longer, the number of the complementing MFM patterns to be selected is correspondingly increased, involving an increased probability of the drop-out interval being supplemented by improper or inappropriate complementing MFM signal patterns.

Figure 12:
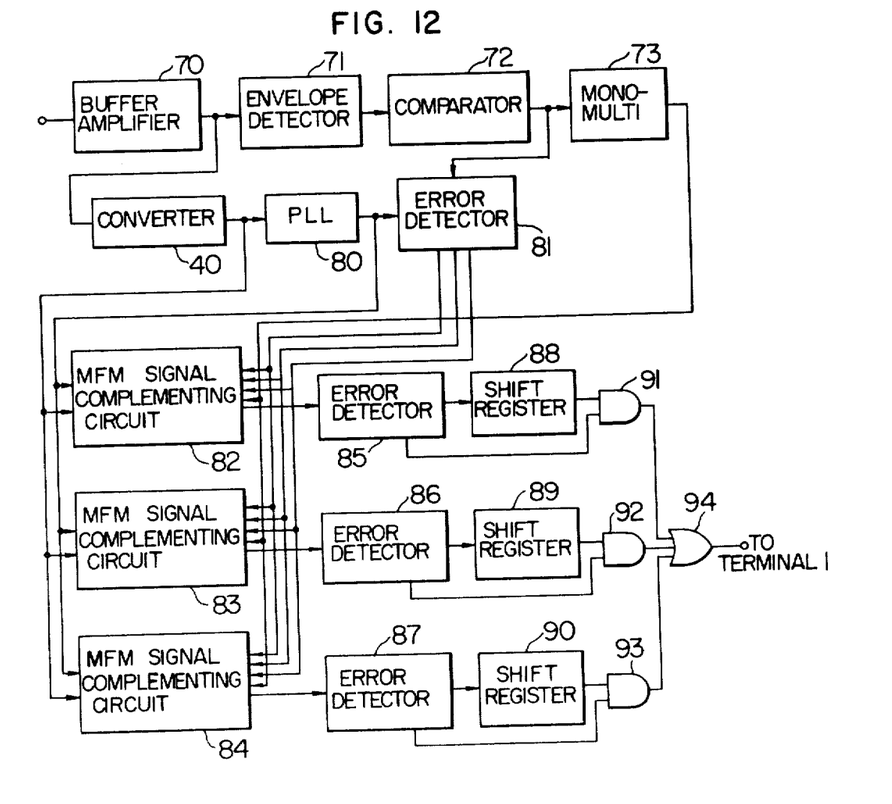
FIG. 12 is a block diagram of another embodiment of the reproducing circuit of the present invention.

FIG. 12 shows another embodiment of the reproducing circuit of the invention. In this figure, the components which are identified with same reference numerals as those shown in FIG. 10 serve for the same or equivalent functions. In FIG. 12, reference numeral 80 denotes a phase-locked loop circuit, 81 denotes an error length detecting circuit, 82, 83 and 84 denote MFM signal complementing circuits, 85, 86 and 87 denote error detecting circuits, 88, 89 and 90 denote shift registers, 91, 92 and 93 denote AND gates, and 94 denotes an OR-gate. The phase-locked loop circuit 80 is constituted by the phase comparator 45, the low-pass filter 46 and the VCO 47 in the same manner as shown in FIG. 10 so as to exhibit the same function. Further, each of the MFM signal complementing circuits 82, 83 and 84 is constituted by the read-only memory 61, the multiplexers 64 and 65, the SR-flip-flop 66, the counters 67 and 68, the shift registers 60, 62 and 63 described above with reference to FIG. 10 and serves for complementing or supplementing the drop-out intervals of the MFM signal with the corresponding bit patterns stored in the ROM 61.

When a signal drop-out interval becomes longer, a plurality of the complementing MFM signal patterns will be required for the drop-out interval to be complemented. In the case of the embodiment shown in FIG. 10, however, only one type of complementing signal pattern will be read out from the memory and inserted in the drop-out period. As a consequence, there may arise a case in which some of the complementing signal patterns to be inserted would be erroneous, involving difficulty in reproducing the MFM signal correctly by compensating the signal drop-out interval.

With the circuit arrangement shown in FIG. 12, the MFM signal whose drop-outs are complemented by means of the three MFM signal complementing circuits 82, 83 and 84 are checked with the aid of the error detecting circuits 85, 86 and 87, so that only the correctly complemented MFM signal can be produced as the output for reproduction.

When a signal drop-out is detected by the envelope detection circuit 71, the length of the drop-out interval is determined by the error length detecting circuit 81. The output signal from the error length detecting circuit 81 is applied to the inputs of the MFM signal complementing circuits 82, 83 and 84, respectively, together with the MFM signal and the clock signal available from the phase-locked loop circuit 80. In each of the MFM signal complementing circuits 82, 83 and 84, a complementing MFM signal pattern is determined in dependence on the states or levels taken by the MFM signal immediately before and after the signal drop-out, and read out from the associated ROM. Up to this stage, the complementing operation is performed in the same manner as in the case of the embodiment shown in FIG. 10. The MFM signals each inserted with a complementing MFM signal pattern are then supplied to the respective error detecting circuits 85, 86 and 87.

Each of the error detecting circuits 85, 86 and 87 checks whether the MFM signal drop-out has been complemented with the correct complementing MFM pattern and produces an output signal of level "1", for example, when it has been found that the drop-out of the MFM signal is correctly complemented. In response to the "1" level output from the error check circuit 88, 89 or 90, the associated AND-gate 91, 92 or 93 is enabled, whereby the correctly complemented MFM signal is outputted through the OR-gate 94. The checking operation performed by the error detecting circuit can be accomplished with the aid of error detection signal added to the incoming MFM signal. Alternatively, the error detecting circuit may be constructed by a shift register and a pattern detector for detecting a particular bit pattern.

As will be appreciated from the above description, the embodiment shown in FIG. 12 allows the correct MFM signal to be reproduced for correct demodulation, even when the signal drop-out interval of the incoming MFM signal is relatively longer so that the number of the complementing MFM signal patterns to be inserted is correspondingly increased. This is because at least one of the MFM signal complementing circuits will certainly complement the signal drop-out with a proper one of the MFM patterns read out from the memory.

In the above description of the embodiment shown in FIG. 12, it has been assumed that three error detecting circuits are employed in combination with three shift registers 88, 89 and 90. It should, however, be appreciated that the invention is never subjected to such restriction.

It will now be appreciated that the present invention has provided a MFM signal reproducing apparatus which is capable of producing a circuit MFM signal regardless of the presence of drop-outs in the MFM signal by virtue of the fact that these signal drop-outs are complemented with corresponding MFM signal patterns stored previously in a memory for complementation. In addition, it is understood that the present invention is not limited to the MFM signal reproduction but can be applicable to aN MFM signal reproduction of 3PM, EFM or the like.

We claim:

1. A demodulation circuit for demodulating a modulated digital signal which is modulated under a certain modulation system in which the phase of the digital signal is inverted at predetermined intervals in accordance with a modulation rule depending on the successive values of the modulated data, comprising:

a clock generator circuit for generating a clock signal having a frequency which is an integral multiple of the bit frequency of said modulated digital signal;

at least one pattern detector means connected to receive said modulated digital signal for detecting whether said modulated digital signal is inverted correctly at a predetermined interval in accordance with said modulation rule of said modulated digital signal and for producing a discrimination signal in synchronism with said clock signal and in response to a detected predetermined pattern of signal values only when the phase of the modulated signal is correctly inverted;

demodulating clock generator means connected to said pattern detector means for generating a demodulating clock signal which is restricted to a predetermined phase of said clock signal in response to said discrimination signal at the output of said pattern detector means; and demodulating means for demodulating said modulated digital signal to produce digital informations "0" and "1" at the timing of said demodulating clock signal.

2. A demodulation circuit as claimed in claim 1, wherein said pattern detector means comprises a shift register for shifting said modulated digital signal by said clock having the frequency which is an integral multiple of the bit frequency of said modulated digital signal, and a detector circuit for detecting a predetermined pattern of outputs at each stage of said shift register.

3. A demodulation circuit as claimed in claim 2, wherein said demodulating means includes means for demodulating said modulated digital signal to produce the digital informations "0" and "1" by comparing outputs at specific two output stages of said shift register, at the timing of said demodulating clock.

4. A demodulation circuit as claimed in claim 1, wherein said clock generator circuit comprises:

a shift register for shifting said modulated digital signal by a reference clock having a frequency which is an integral multiple of the bit frequency of said modulated digital signal;

a detector circuit for detecting a predetermined pattern of outputs at each output stage of said shift register; and a frequency divider for dividing said reference clock in response to an output signal of said detector circuit, to produce an output clock which serves as said clock of said clock generator circuit.

5. A demodulation circuit as claimed in claim 1, further comprising a modulated digital signal reproducing circuit which comprises:

a signal drop-out detecting circuit for detecting the presence of signal drop-outs in said modulated digital signal;

an inversion detecting circuit for detecting inverting points of said modulated digital signal;

a signal drop-out duration detecting circuit for detecting duration of said signal drop-out on the basis of the output signals from said signal drop-out detecting circuit, and said inversion detecting circuit;

a logic circuit for producing only the edge signal of said modulated digital signal which first appears after termination of said signal drop-out duration;

a signal state discriminating circuit for producing the state of said modulated digital signal immediately before and after said signal drop-out;

memory means for outputting a complementing digital signal pattern in accordance with a drop-out duration detection signal produced from said signal drop-out duration detecting circuit and an output signal produced from said signal state discriminating circuit; and a switching circuit of which operation is initiated by the edge signal produced from said logic circuit means for thereby outputting said complementing digital signal when said drop-out has occurred.

6. A demodulation circuit as claimed in claim 5, wherein said reproducing circuit comprises an error detector circuit for detecting whether said complementing digital signal is correct or not.

7. A demodulation circuit as claimed in claim 6, wherein said reproducing circuit comprises a plurality of said memory means and corresponding numbers of said error detector circuit.

* * * * *